(12) United States Patent
Ardalan et al.

(10) Patent No.: US 12,706,990 B2
(45) Date of Patent: Aug. 11, 2026

(54) SNMP SUPPORT FOR REMOTELY DISTRIBUTED DEVICES

(71) Applicant: Airgain, Inc., San Diego, CA (US)

(72) Inventors: Sasan Ardalan, Las Vegas, NV (US); Shenjie Miao, San Diego, CA (US); Yi Wang, San Diego, CA (US); Dacian Ovidiu Demian, Ontario (CA); Cheng-Yuan Chin, San Diego, CA (US); Ali Sadri, San Diego, CA (US)

(73) Assignee: Airgain, Inc., San Diego, CA (US)

( * ) Notice: Subject to any disclaimer, the term of this patent is extended or adjusted under 35 U.S.C. 154(b) by 1 day.

(21) Appl. No.: 18/781,297

(22) Filed: Jul. 23, 2024

(65) Prior Publication Data

US 2025/0062947 A1 Feb. 20, 2025

Related U.S. Application Data

(60) Provisional application No. 63/532,937, filed on Aug. 16, 2023.

(51) Int. Cl.
*H04L 69/085* (2022.01)
*H04L 12/28* (2006.01)
(Continued)

(52) U.S. Cl.
CPC .......... *H04L 69/085* (2022.05); *H04L 12/283* (2013.01); *H04L 41/0213* (2013.01);
(Continued)

(58) Field of Classification Search
CPC ....... H04L 12/2823–2836; H04L 43/06–0817; H04L 41/04–048; H04L 67/12–67/125; H04L 69/08–69/085; H04L 69/169
See application file for complete search history.

(56) References Cited

U.S. PATENT DOCUMENTS 6,404,743 B1 6/2002 Meandzija
7,495,568 B2 * 2/2009 Banerjee ............... H04L 67/125 709/201
(Continued)

FOREIGN PATENT DOCUMENTS

CN 101848107 A * 9/2010 ......... H04L 41/0213
EP 2228965 A1 * 9/2010 ............. H04L 47/26

OTHER PUBLICATIONS

S. S. Chavan and R. Madanagopal, "Generic SNMP proxy agent framework for management of heterogeneous network elements," 2009 First International Communication Systems and Networks and Workshops, Bangalore, India, 2009, pp. 1-6.*
(Continued)

*Primary Examiner* — Brendan Y Higa
(74) *Attorney, Agent, or Firm* — Mueting Raasch Group

(57) ABSTRACT

A system includes a plurality of network access devices that are remotely distributed and coupled to at least one Internet-coupled, wide-area wireless network. Each of the plurality of network access devices persistently execute respective device management programs. The device management programs are operable to read and change local device status and maintain respective persistent network socket connections. The system includes an Internet-coupled data center with one or more servers that operate a plurality of Simple Network Management Protocol (SNMP) agent programs. Each of the SNMP agent programs communicate with a respective one of the device management programs via the persistent network socket connections. The SNMP agent programs provide an SNMP interface at the data center. A network management station manages the respective network access devices via the respective SNMP interfaces, the respective device management programs, and the respective persistent network socket connections.

22 Claims, 7 Drawing Sheets

(51) Int. Cl.
*H04L 41/0213* (2022.01)
*H04L 41/046* (2022.01)
*H04L 67/125* (2022.01)
*H04L 69/16* (2022.01)

(52) U.S. Cl.
CPC .......... *H04L 41/046* (2013.01); *H04L 67/125* (2013.01); *H04L 69/162* (2013.01); *H04L 69/169* (2013.01)

(56) References Cited

U.S. PATENT DOCUMENTS 7,925,731 B2* 4/2011 Adams .................. H04L 41/046 709/217
8,810,421 B2 8/2014 Deaver, Sr. et al.
10,291,477 B1* 5/2019 Askar ..................... H04W 4/50
10,419,319 B1 9/2019 Waldbusser
11,601,187 B2 3/2023 Ashworth
2001/0029548 A1* 10/2001 Srikantan ................ G06F 9/542 709/227
2002/0069259 A1 6/2002 Kushwaha
2003/0131118 A1* 7/2003 Lee ....................... H04L 69/085 709/230
2005/0160163 A1* 7/2005 Nguyen .............. H04L 43/0811 709/223
2006/0026301 A1* 2/2006 Maeda .................. H04L 41/046 709/224
2007/0044094 A1* 2/2007 Banerjee ............... H04L 67/125 370/428
2012/0311142 A1* 12/2012 Stargardt ............ H04L 41/0226 709/224
2013/0246594 A1 9/2013 Ahmad
2014/0089487 A1 3/2014 Debate
2014/0108664 A1* 4/2014 Falco ...................... G06F 16/10 709/227
2014/0122806 A1* 5/2014 Lin ......................... H04L 67/12 711/126
2015/0271299 A1* 9/2015 Bullotta .................. H04L 69/18 709/230
2017/0104812 A1* 4/2017 Choi ....................... H04L 67/12
2017/0201585 A1* 7/2017 Doraiswamy ....... H04L 41/0806
2020/0162556 A1* 5/2020 Wood ..................... G06Q 10/06
2021/0314407 A1* 10/2021 Ng ........................ H04L 67/141

OTHER PUBLICATIONS

International Patent Application No. PCT/US2024/038515, filed Jul. 18, 2024; International Search Report / Written Opinion issued Oct. 9, 2024; 10 pages.

* cited by examiner

SNMP SUPPORT FOR REMOTELY DISTRIBUTED DEVICES

CROSS REFERENCE TO RELATED APPLICATIONS

This application claims the benefit of 63/532,937, filed Aug. 16, 2023, the disclosure of which is incorporated by reference herein in its entirety.

SUMMARY

This application relates generally to devices that facilitate network access in remote locations and devices that can extend wireless network access at a location (e.g., repeaters). In one embodiment, a system includes a plurality of network access devices that are remotely distributed and coupled to at least one Internet-coupled, wide-area wireless network. Each of the plurality of network access devices persistently execute respective device management programs. The device management programs are operable to read and change local device status and maintain respective persistent network socket connections. The system includes an Internet-coupled data center with one or more servers that operate a plurality of Simple Network Management Protocol (SNMP) agent programs. Each of the SNMP agent programs communicate with a respective one of the device management programs via the persistent network socket connections. The SNMP agent programs provide an SNMP interface at the data center. A network management station manages the respective network access devices via the respective SNMP interfaces, the respective device management programs, and the respective persistent network socket connections.

In another embodiment, a method is operable on a network access device operating remotely from a data center. The method involves connecting the network access device to an Internet-coupled, wide-area, wireless network. Via a persistently-executing, device management program running on the network access device, a persistent network socket connection is established over the wireless network with a Simple Network Management Protocol (SNMP) agent program. The SNMP agent program runs at the data center and manages SNMP services on behalf of the network access device. Based on commands received via the persistent network socket connection, a status of the network access device is read and/or changed via the device management program. In response to the commands, status data is sent to the SNMP agent program which uses the status data to communicate the status of the network access device to a network management station via SNMP.

In another embodiment, method is operable via a data center. The method involves receiving connection requests from persistently-executing, device management programs running on respective network access devices. The network access devices are coupled to the data center via one or more Internet-coupled, wide-area, wireless networks. The connection requests establish respective persistent network socket connections to the data center. The persistent network socket connections are coupled to a multithreaded socket server that interfaces to dedicated SNMP agent programs on behalf of each of the network access devices. SNMP commands are initiated via the SNMP agent programs. The commands cause corresponding non-SNMP commands to be sent via the persistent network socket connections to the respective device management programs. In response to the non-SNMP commands, non-SNMP status data are received at the SNMP agent programs which use the non-SNMP status data to communicate statuses of the respective network access devices to a network management station via SNMP.

The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
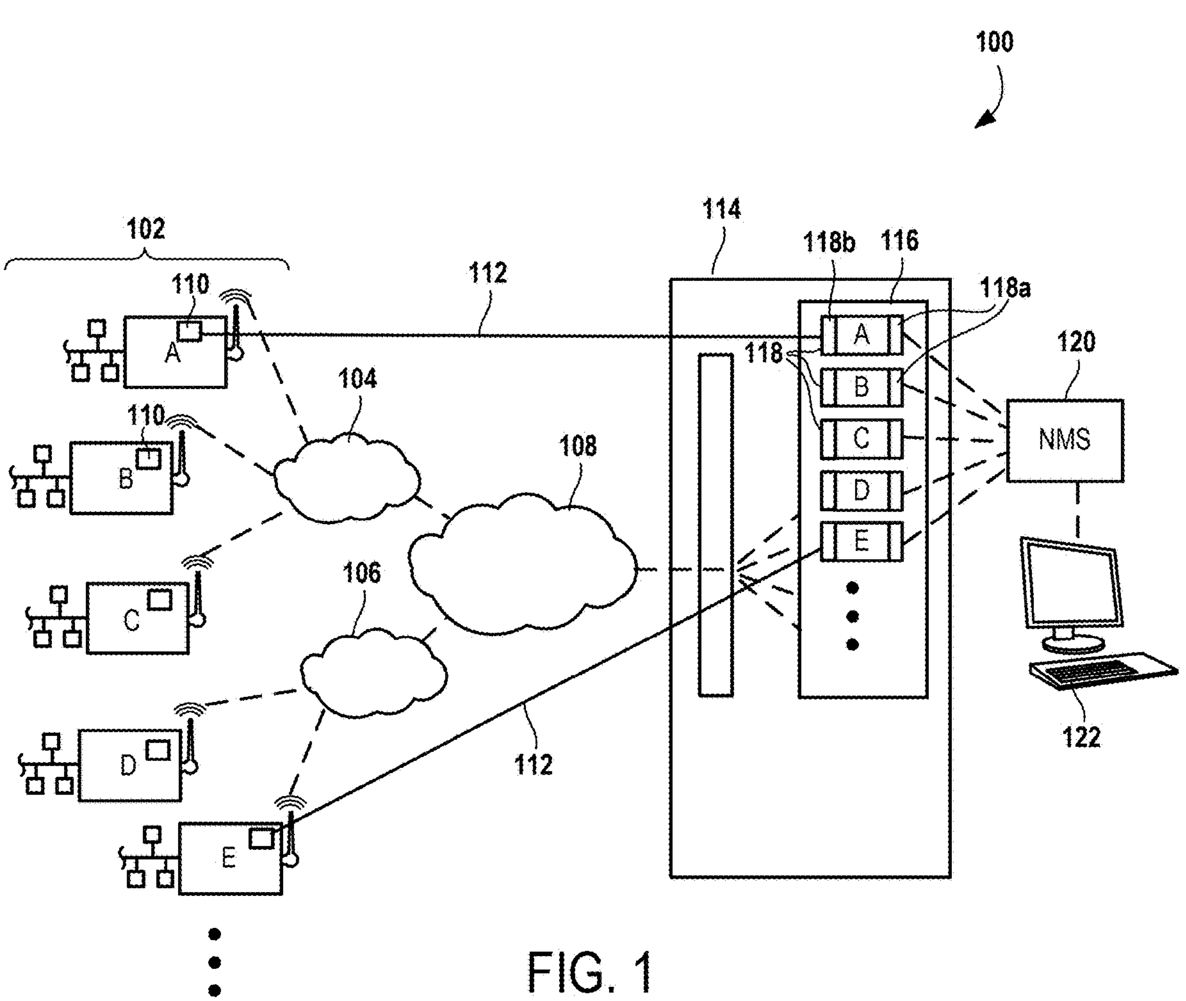
FIG. 1 is a block diagram of a system according to an example embodiment.

Embodiments disclosed herein are directed to an architecture to support the control, monitoring and processing for a scalable number of network access devices. Generally, a network access device in one embodiment is special-purpose device that can serve as a local access point to a wide area network (WAN) and/or global area network (GAN), the Internet being an example of the latter. For example, a network access device may include a modem suitable for installation on a vehicle such as a commercial fleet vehicle or on a fixed site, such as a weather station. A radio repeater, e.g., 5G repeater may also be considered a network access device. Some network devices may include other functionality such as router, gateway, firewall, Dynamic Host Configuration Protocol (DHCP) server, although this is not required. The network access device may provide high speed network access, e.g., via 5G cellular networks, or older networks such as long term evolution (LTE) 4G networks. In some embodiments, the network access device can access the network through other network means, like cell phone tethering. In other words, the network access device can provide Internet access by itself or via another network access device.

Depending on the target use case, the hardware used for a network access device may include a low-power (e.g., around 80 MHz) embedded 32 bit processor or a computing system with greater processing capability and memory that supports an operating system and application stack (e.g., OpenWRT with MIPS or ARM Processor). The former may be desirable to maintain relatively slow network connections with restrictive electrical power budgets (e.g., battery powered) and the latter may be desirable for an installation that supports multiple users at higher speeds, at the cost of (among other things) a relatively higher power consumption. In these examples, the available services and features may vary between device architectures, with embedded devices including minimal features to achieve, among other things, low cost and low power consumption.

An organization may employ a large number of network access devices that are widely distributed geographically and of various configurations. This can complicate management of these devices, e.g., to determine status/alerts, apply changes, etc. Protocols have been developed to manage devices in this way, notably Simple Network Management Protocol (SNMP). Managed devices (e.g., computers, routers, printers) often include an SNMP agent which gathers data from the managed device and communicates with a network management station (NMS) on the network. Using SNMP, a network administrator can manage and monitor a large number of SNMP devices from a single interface.

Organizations such as businesses, schools, governments often employ SNMP to manage their network devices. However, these organizations typically have full control over their local networks. For organizations with geographically separated local networks, the networks can be tied together via virtual private network (VPN) tunnels or the like. A VPN tunnel allows different local networks to securely and reliably connect to each other via insecure channels such as the public Internet. Even so, it is not trivial to implement an SNMP monitor and control system over multiple distributed networks, as the tunnels will need to be properly configured so that the SNMP traffic is reliably routed through multiple sub-networks in both directions.

For smaller network access devices, a VPN tunnel that provides a full Internet Protocol (IP) stack may not be practical, as the devices may have limited processing capability and the VPN protocols use significant overhead that may not be readily available over wireless large area networks. Nonetheless, it is desirable to implement SNMP (or other similar network management protocol) to a collection of remotely distributed network access devices. This can avoid costly on-site, in-person visits to troubleshoot issues, perform reconfiguration, and the like. Further, while the SNMP protocol is not necessarily optimized for small, mobile devices, its wide adoption makes it a desirable choice to manage these types of devices.

Embodiments described herein provide SNMP support for monitoring and control of network access devices. This support includes trap processing, which involves an asynchronous alert sent from an SNMP Agent to the NMS. The network devices utilize a long range wireless data access protocol via cellular-phone-standard networks such as 3G, 4G, 5G, LTE, Edge, etc. These wireless networks pass packet-switched, IP traffic, although may not allow certain traffic to pass certain directions. For example, a Transmission Control Protocol (TCP) SYN IP packet may not be allowed to pass from the Internet to a mobile station on the wireless network, although a SYN packet will be allowed to pass the other way to connect the mobile station to an Internet server.

In order to effectively manage a large number of network access devices, a network service element (e.g., a process operating on an Internet-attached server) should be able to send certain commands to the network access device in real-time or near-real-time (e.g., round-trip time of around 3000 ms or less) and receive a response to the command in an equivalent time frame. This allows, for example, an engineer at one end of the country to monitor the network device (for optimum performance) while a technician at another part of the country moves and/or aims the network device towards a base station.

As will be described herein below, real-time access also refers to being kept alive (e.g., best effort to keep running and connected to a network 24/7) to receive commands asynchronously. If the device was allowed to occasionally disconnect from the server, the response time will be increased at least by the time needed to establish a new connection. The network access device embodiments described herein maintain a persistent Internet socket connection, thereby reducing these types of delays in device-to-server communications.

Real-time access to the network access device also allows for processing of alarms (resulting in traps in SNMP) as they occur. Real-time control allows a network access device to be put to sleep on demand. Situations resulting in the device causing interference or abnormal behavior can be dealt with in timely fashion via real-time network communications. Furthermore the device can be configured in real-time for optimization such as beam steering and positioning while monitoring the RSSI. Polling of device sensor data such as temperature without rescheduling is another advantage of real-time access. In the following disclosure, embodiments are described that can be used to effectively manage a large number of network access devices.

In FIG. 1, a block diagram shows a system 100 according to an example embodiment. The system 100 includes a plurality of network access devices 102 that are remotely distributed and coupled to at least one Internet-coupled, wide-area wireless network. While the network access devices 102 are shown in FIG. 1 with a LAN interface on the left side, a LAN interface (e.g., Ethernet, WiFi) is not used in all embodiments. In this example, two distinct wireless provider networks 104, 106 are shown, each coupled to the Internet 108. Each of the plurality of network access devices 102 persistently executes respective device management programs 110. The device management program 110 is operable to, among other things, read and change local device status, that is a status of the device 102 on which it operates. The device management program 110 maintains a persistent network socket connection 112 with an Internet-coupled data center 114.

The data center 114 includes one or more servers 116 that operate a plurality of Simple Network Management Protocol (SNMP) agent programs 118. Each of the SNMP agent programs 118 communicate with a respective one of the device management programs 110 via the persistent network socket connections 112. The SNMP agent programs 118 provide an SNMP interface **118*a* at the data center 114. A network management station 120 manages the respective network access devices 102 via the respective SNMP interfaces 118*a*, the device management programs 110, and the respective persistent network socket connections 112**, e.g., TCP/IP sockets.

Generally, the persistent network socket connections 112 are logical network representations that generically represent underlying network and physical links, e.g., wired or wireless network media and protocols. The network socket connections 112 are persistent in the sense that the device management program 110 makes a best effort to keep the socket connection 112 (or an equivalent socket connection) open continuously. For example, the persistent network socket connection 112 may be inadvertently disconnected due to a loss of signal. In such an event, the device management program 110 will attempt to repeatedly attempt to re-establish the network socket connection 112. This reestablishment may change some logical values of the socket connection (e.g., port numbers, source and destination IP addresses) and so in some sense the re-established socket may be considered a different socket. A TCP/IP sets is generally defined by two sets of numbers, each set of the form {IP address, TCP port}. Each set defines a communication channel, one channel being client-to-server and the other server-to-client.

In some installations, the network access devices 102 will never go to sleep mode or standby mode. Further, the devices 102 are configured to keep the device management program 110 always running, or persistently executed as described above. Thus the persistent network socket connection 112 should be always available as much as possible. Because some socket parameters may need to change over time (e.g., network access devices 102 may move to a different carrier network and reestablish the socket connection with a different remote IP address) a universally unique identifier such as a media access control (MAC) address or custom identifier may be used to define the persistent network socket connection 112 at a high-level. This allows the specific TCP/IP socket parameters to change over time while the unique identifier remains unchanged, facilitating an efficient way to track and lookup data, e.g., using the identifier as a database primary key in tables that store data of the network access devices 102.

The SNMP agent programs 118 can take advantage of a server environment, which includes high availability, ample computing resources, case of management, etc. In this way, that the experience of the organization monitoring the system, as indicated by terminal 122, is not unlike traditional SNMP installations which monitor local enterprise devices. The SNMP agent programs 118 can be programed to account for the types of problems associated with remote devices that operate over unreliable data links, which is not an assumption for typical SNMP implementations. For example, some data can be cached by an SNMP agent program 118 and used to respond to some queries even if the associated network access device 102 is currently unreachable.

Another advantage provided by the SNMP agent programs 118 relates to a generic device interface **118*b* used to communicate with the network access devices 102 via the persistent network socket connections 112. This generic interface 118*b* facilitates communicating via a common protocol over the connections 112, such that a single code base can be used for the SNMP agent programs 118 to manage a diversity of network access devices 102**. This is different than how SNMP agents are typically implemented, where the device status tracking code is closely bound to the hardware that the agent is monitoring.

Figure 2:
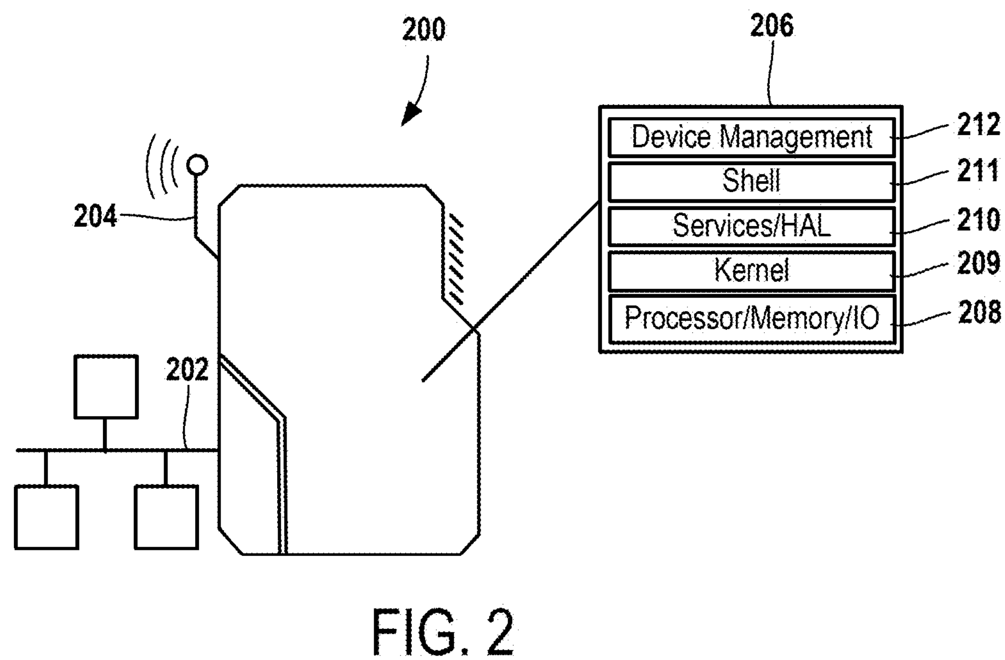
FIGS. 2-5 are block diagrams of network access devices according to various example embodiments.

In FIGS. 2-5, block diagrams show network access devices that may be used in the system 100. In FIG. 2, a block diagram shows a network access device 200 according to an example embodiment. The network access device 200 is suitable for providing fixed network support, as indicated by local area network (LAN) interface 202. The network access device 200 connects to an Internet-coupled, wide-area wireless network as indicated by antenna 204. The wireless network may be a high-speed network such as 4G/5G mobile data network however the network access device 200 may be compatible with other networks, e.g., 2G Edge networks, satellite data networks.

The network access device 200 may include what is often considered a full computing hardware and software stack, as indicated in by components 206. The hardware is indicated by block 208, which includes a processor, e.g., central processing unit (CPU), memory, input/output (I/O). In some cases, the network access device 200 includes an operating system (OS) with a kernel 209 that provides low-level hardware access. In other case an embedded program (e.g., in the C language) provides low-level hardware access. A services and hardware abstraction layer (HAL) 210 interfaces with the kernel 209 which allows higher level programs to access hardware and other services via a common interface, e.g., application program interface (API). The kernel 209 and services/HAL 210 are often collectively considered as the OS, although a particular OS may have more or fewer elements or an OS may not be used, instead an embedded program provides the interface.

A shell 211 represents a user program that operates on the OS and may interact with a user and/or operate in a background or batch mode. Generally, the shell 211 is a general-purpose program that provides a user environment to launch specific end-user programs. Examples of a shell include Unix shells (sh, bash, csh). The user programs include the device management program 212, which will be described in greater detail below.

The network access device 200 can provide a customer site with LAN access to the Internet. As such, other user programs besides the device management program 212 may be part of the components 206 installed in the device 200, allowing the device 200 to perform functions such as router, gateway, firewall, DHCP server, DNS cache, etc. In some embodiments, the OS may include a Linux kernel with GNU core utilities. The GNU/Linux OS is robust, secure, highly-configurable, and runs on a wide variety of hardware. The GNU/Linux OS has native IP network stacks, including TCP/IP and UDP/IP. The network access device 200 may include other hardware not shown, such as a 5G/LTE modem, Ethernet controller, power management controller, etc.

The device management program 212 supports, real-time, two-way TCP/IP connections to a dedicated SNMP agent program 118 on an Internet-accessible data center 114. The device management program 212 may be written in a language such as C that produces efficient, native machine code, although other programming languages may be used, as well as non-native code that runs on virtual machines. The device management program 212 is activated on boot-up, e.g., as a background daemon. Generally, a daemon is a background program that is intended to run continuously, or be started automatically as needed. A similar functionality to a daemon is provided in Windows operating systems by what is referred to as "services."

In the Linux daemon implementation, special programs (e.g., watchdog shell scripts) can keep the device management program 212 persistently running even if the TCP/IP connection is lost, the device management program crashes, etc. The device management program 212 makes a TCP/IP connection to the data center 114 where it is connected to a SNMP agent program 118. The device management program 212 also interfaces with hardware and software services on the network access device 200 in order to provide status data that can be used by the SNMP agent program 118. For example, the device management program 212 can use a GNU/Linux utility such as 'lm-sensors' to determine CPU temperature. Similar utilities may be used to access other hardware such as a data modem to determine relevant information about the data link, such as signal strength, channels/bands being used, amplifier status, etc. While the part of the device management program 212 that communicates with the data center 114 may be generic, the part that interfaces with the network access device 200 will be customized for the particular type and version of hardware and software on the device 200.

Figure 3:
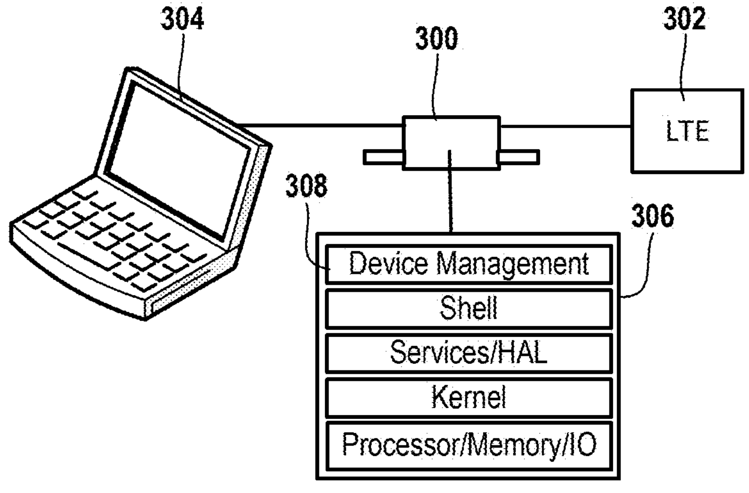

In FIG. 3, a block diagram shows a network access device 300 according to another example embodiment. The network access device 300 supports mobile and fixed stations with high-speed connection through, for example, an LTE modem 302. The network access device 300 is sometimes referred to as an Ethernet injector, which acts as a bridge between the LTE modem 302 and an Ethernet port, port on computer 304. The network access device 300 may be connected via Universal Serial Bus (USB) to the modem 302. The computer 304 can access the 4G LTE wireless network of a network provider by connecting to the Ethernet port. In other embodiments, a WiFi router, Ethernet switch, etc., can also be connected to support multiple network devices.

The network access device 300 supports an embedded Linux OS with full TCP/IP stack support, as indicated by components 306. Like the device 200 in FIG. 2, the device 300 in FIG. 3 includes a device management program 308 that monitors local device status and communicates it with an SNMP agent program 118 that runs on an Internet-accessible data center 114. The device management program 308 will have similar features as described in relation to the program 212 in FIG. 2, such as maintenance of a persistent socket connection, background operation as a daemon, watchdog application or script to start and keep the daemon running, etc. Because the hardware and/or software of the two devices 200, 300 will likely differ, the device management programs 212, 308 will be differently configured to account for this. Nonetheless, the device management programs 212, 308 will both have the same generic interface to connect to dedicated SNMP agent programs 118. Further, both device management programs 212, 308 can rely on an OS such as Linux to provide a significant amount of functionality.

Figures 4, 5:
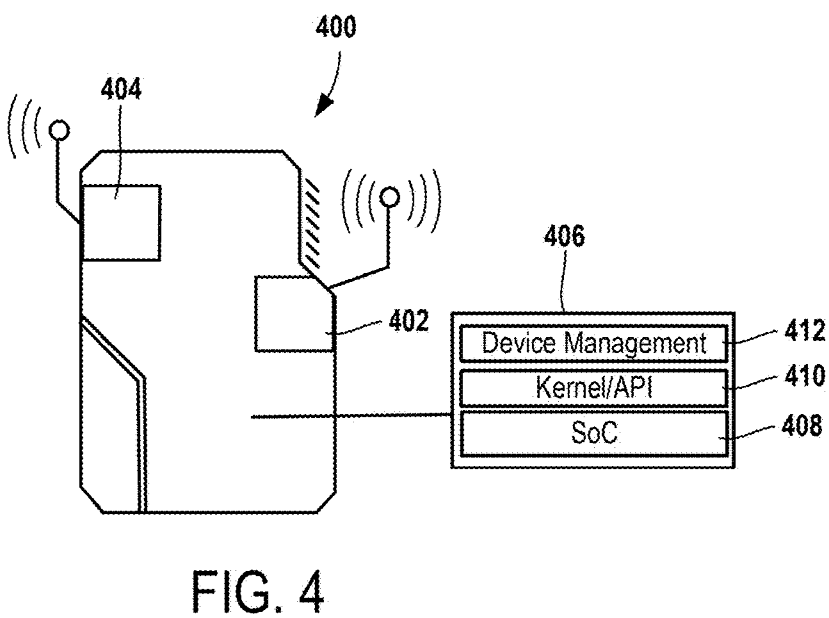

In FIG. 4, a block diagram shows a network access device 400 according to another example embodiment. The network access device 400 is configured that access to the Internet via, e.g., a peripherally-attached, LTE modem 402. The LTE modem 402 is configured through AT commands. The LTE modem 402 supports a TCP/IP connection to a TCP/IP server via the Internet The network access device 400 is an embedded system, as indicated by components 406, which include System On a Chip (SoC) 408, a basic firmware interface, indicated by kernel/API 410, and an embedded device management program 412 which runs on the system firmware. The kernel/API 410 does not have the features and services typically associated with an OS, and so the management program 412 is referred to herein as embedded object code running on an embedded system without an operating system. The network access device 400 interfaces to a radio repeater 404 (e.g., a 5G repeater) through for example an RS-232 serial interface (or SPI interface). The SoC 408 can get access to all parameters of the repeater 404 and also set any parameter of the repeater. Those parameters may include beam steering, Network Provider Base Station RSSI, etc. In this case 400 can provide full two way real-time control of the repeater by the SNMP Agent via the NMS.

The block diagram in FIG. 5 shows more information about the network access device 400. The LTE modem 402 is interfaced to the SoC 408 via a Universal Asynchronous Receiver/Transmitter (UART) interface 500, also known as a serial peripheral interface. The device management program 412 for this device 400 is called the Remote Command Unit (RCU). The RCU program runs in the SoC 408 and interfaces to the LTE modem 402 and the radio repeater 404 that are peripherally attached via respective UART interfaces 500, 502. An API exists for the RCU firmware to control the radio repeater 404 and obtain information through the UART interface 502.

The network access device 400 also has an Electrically-Erasable, Programmable, Read-Only Memory (EEPROM) 504 that stores the IP and TCP port of the TCP/IP Server in the data center to which it establishes a TCP/IP connection via the LTE modem 402. The RCU subsystem has a unique identifier (e.g., 48-bit binary value) that identifies the network access device 400 to enterprise entities for purposes of identification via the SNMP agent program 118. The unique identifier is also stored in the EEPROM 504. The unique identifier is used instead of, e.g., fixed hardware addresses analogous to MAC addresses, because some network interface devices may not have an equivalent unique address. Ethernet devices have a MAC address, but some network access devices (such as this device 400) don't have an Ethernet interface. Even if it a network interface device has a unique hardware address, some network interfaces (e.g., modems, network interface cards). Thus a hardware change would require reconfiguring the monitoring and control system in such an event to account for the new hardware address. By being stored in the EEPROM 504, the unique identifier stays with the SoC 408 of the network access even when peripheral hardware is changed, and the unique identifier can be retrieved via the EEPROM 504 even if a modem fails, which might not be the case of a modem-stored ID was used. Also seen in FIG. 5 are a Wifi Access Point (AP) 506 and serial port 508 that can be used for local control and configuration of network access device 400 and repeater 404, e.g., for initial setup and field maintenance.

Figure 6:
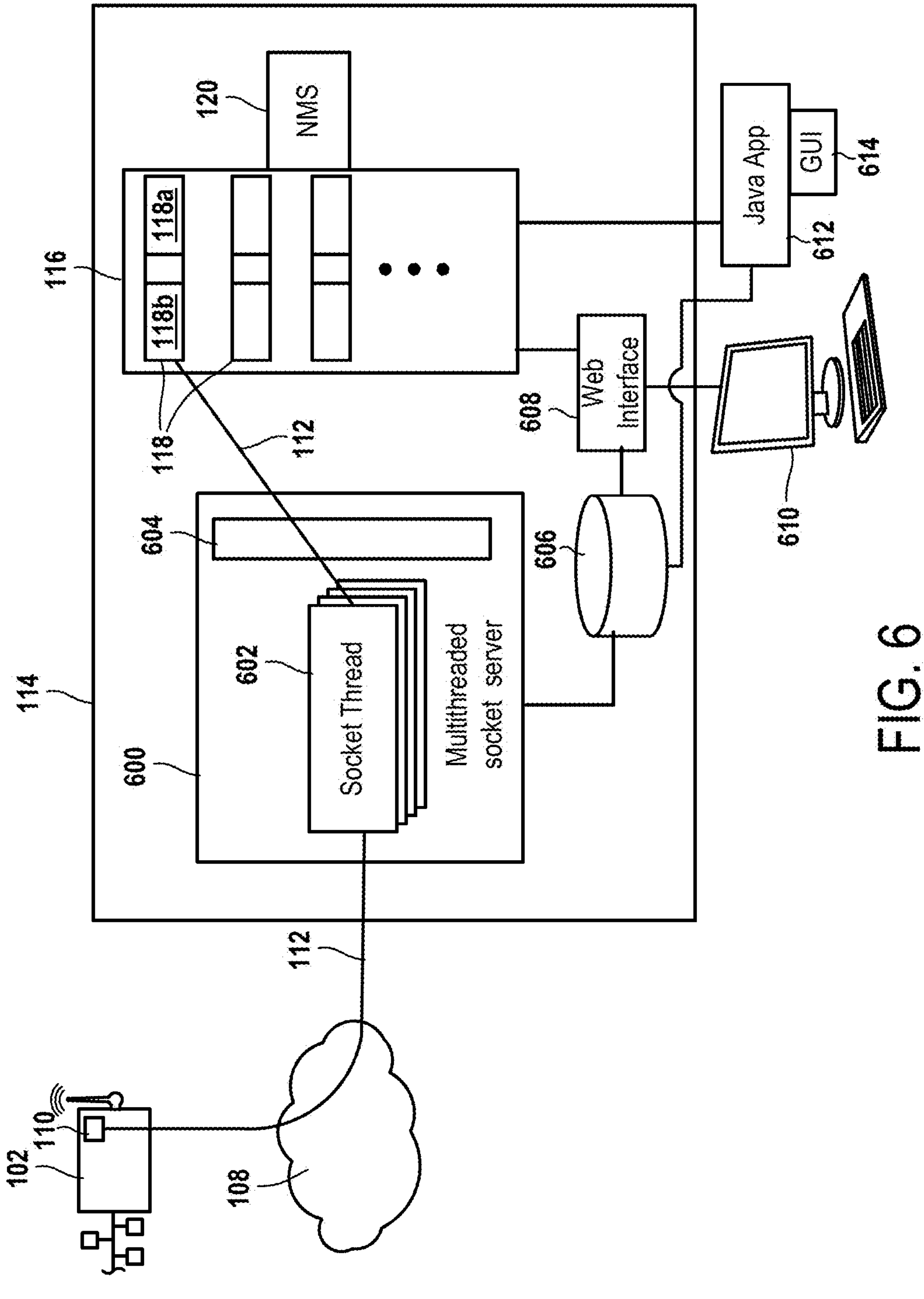
FIG. 6 is a block diagram showing details of a data center according to an example embodiment.

In FIG. 6, a block diagram shows aspects of a data center 114 according to an example embodiment. The data center 114 may include an enterprise level architecture, e.g., distributed computing, mass storage, redundancy and high-availability features. The data center supports a network access device 102 which includes any device types as described above in FIGS. 2-5. The network access device 102 initiates and establishes a TCP/IP socket connection with an Internet-facing server, which is referred to herein as a multi-threaded socket server 600. The multi-threaded socket server 600 may include more than one server, e.g., a load balancing server, etc., that accept connections from device management program 110 of the network access device 102 via the Internet 108 and hands off the connections to another software module or machine that manages the connections thereafter.

The multi-threaded socket server 600 spawns a socket thread 602 that connects each device management program 110 with its dedicated SNMP agent program 118. The SNMP agent program 118 will initiate and establish a TCP/IP connection to the multi-threaded socket server 600. The socket threads 602 are used to provide a link from the network access device 102 to each respective SNMP agent program 118. The socket threads 602, like the name implies, may be launched as lightweight processes from a single server program, which can minimize computer resource utilization for large numbers of threads 602. In some embodiments, however, the socket threads 602 could be standalone processes, e.g., each having a separate process ID in the operating system.

As noted above, each SNMP agent program 118 is associated with a respective network access device 102, e.g., a 1:1 mapping. The SNMP agent programs 118 have SNMP interfaces 118*a* and device interfaces 118*b*. The device interface 118*b* uses a generic message passing interface that will be described below and can be implemented on all versions and types of the device management programs 110.

Both SNMP agent program 118 and NMS 120 can run on the same server or subnet, keeping SNMP traffic local and off the Internet 108.

Because of the nature of network connections, the addresses and ports that define TCP/IP sockets that connect the SNMP agent program 118 to the network access device 102 can change over time. For example, the destination IP and port number on the network access device 102 (which connects to the device interface 118*b* of the agent program 118) can be changed through the SNMP agent program 118, allowing the network access device 102 to connect to a different server or data center to facilitate scaling and/or load management. The SNMP interface 118*a* can use the same local IP and port in the data center 114 regardless if the socket parameters of its network access device 102 changes.

Because the IP addresses and ports of the sockets used to communicate between the SNMP agent programs 118 and network access devices 102 can change, it could be complicated to use the socket parameters (e.g., IP addresses) to uniquely identify each device 102 on the system. Therefore, the SNMP agent program 118 and NMS 120 will be associated with a unique identifier as previously described, e.g., a MAC address or a 48-bit identifier that is not associated with a network interface, etc. The unique identifier classifies the data transfer along the whole link from the network access device 102 to the SNMP agent program 118. The unique identifier can therefore be used as an index for data pertaining to the network access device 102, e.g., in database 606.

The database 606 may be configured as a relational database, e.g., MySQL™, Actian™ X, Microsoft™ SQL Server, etc. Such databases are associated with Structured Query Language (SQL) command sets and can be simultaneously accessed by multiple clients locally or via a network. As pertains to the illustrated system, the database 606 may include a table of network access devices 102, in which a primary key is the unique identifier. The device table may include, among other things: a unique identifier of the device 102 and associated SNMP agent program 118; addresses and ports of device-to-server socket; GPS coordinates of the network access device 102; a description of the network access device 102 (e.g., a certain building in certain city); wireless network provider being used by device 102; online status of the network access device 102, etc. Other tables in the database 604 may be used for SNMP-specific purposes, such as having a table logging all alarms, e.g., when a device 102 goes off-line or comes on-line, or a heartbeat timeout alarm generated by the server 600 and/or SNMP agent program 118, etc.

Note that some of the network access device data that is changed infrequently may be cached by the SNMP agent program 118 and stored in the database 604. Examples of such data include, labels/descriptors, last known geolocation, non-dynamic repeater parameters, parameters that do not change unless configured, etc. In some embodiments, the SNMP agent program 118 caches first status data associated with the respective network access device 102. The cached first status data is used to respond to the NMS 120 at times when the persistent network socket connection 112 is down. Second status data (different than the first status data) of the respective network access device 102 is not cached. The second status data may include data that changes regularly, such as signal strength measurements. In response to the NMS 120 requesting the second status data, the SNMP agent program 118 may provide an indication that the persistent network socket connection 112 is down or that some other error has occurred (e.g., connection can be pinged, but device management program 110 is nonresponsive). The unique id is not cached and is used to indicate whether the device is connected (when a request for the unique id is not valid) in addition to heartbeats and pings.

The SNMP agent programs 118 may be implemented to run on a Java™ virtual machine, and may use Java Enterprise Edition (EE) features. Java EE provides a platform with enterprise features such as distributed computing and web services. For example, a Java EE installation is capable of automatically instantiating lightweight objects (e.g., Java Beans) that map to database objects and can be used to perform tasks such as handling network requests. Java EE also manages database connections via Java Database Connectivity (JBDC), which efficiently manages large numbers of database connections and provides a way for applications to access, add, and change database data. The SNMP agent programs 118 can be implemented in a Java EE framework on server 116, as well as other components shown in the data center 114. Note that other frameworks may be used instead of Java to implement the illustrated data center components, such as Microsoft.NET or C++

Another capability provided by Java is the ability to build dynamic web content via technologies such as Java Servlets, Java Server Pages (also known as Jakarta Server Pages), etc. This is indicated by web interface 608, which allows a terminal device 610 to monitor status of software components in the data center 114, including the SNMP agent programs 118, socket threads 602, multi-threaded socket server 600, etc. The web interface is implemented in Java and may run on a server such as Oracle™ GlassFish or Apache Tomcat™. The capabilities provided by the web interface 608 are different than provided by the NMS 120, although some data provided from both may overlap, e.g., remote device status. Generally, the web interface 608 allows a system administrator to monitor the components of the data center 114. In contrast, the NMS 120 allows existing SNMP monitoring tools to monitor the network access devices 102 without requiring any knowledge of the intervening services provided by the data center 114.

Other software may also be used to monitor the data center components besides or in addition to the web interface. An example of this other software is a Java application 612 for monitoring and control of the network access devices 102. The Java application 612 interfaces to the network access devices 10 through the SNMP agent programs 118. In this way, a developer can fully test and verify the SNMP agent performance making the SNMP solution ready for deployment. Note that if another framework such as .NET is used to implement the data center components, then the application 612 may use this other framework instead of Java.

The Java application may provide a graphical user interface (GUI) 614 that facilitates charting parameters such as Received Signal Strength Indicator (RSSI) and temperature in strip charts. The data from the charts can be obtained via SNMP 'get' commands on an interval basis. The Java application 612 has few limitations in user interface and capability, which is not always the case for the web interface 608. The Java application 612 also has access to the database 606, e.g., through JDBC. The Java application 612 provides a list of network access devices 102 and then makes a connection to the SNMP agent programs 118 to monitor and control the device 102. The Java application 612 can also chart alarms and can send messages (e.g., emails, SMS text messages) to a list of impacted personnel.

Any enterprise entity within the data center 114 can make a direct connection to a network access device 102 through an application program interface (API) specific to the server 600 along with the unique identifier. Once the connection is established to the device management program 110 running on the device 102, the enterprise entity can issue commands and obtain responses with requested information. Commands can also be sent that change parameters and activate/de-activate subsystems of the network access devices 102, such as taking a device offline, putting it into suspension (e.g. low power mode), and rebooting it.

The enterprise architecture provides the capability for an SNMP agent program 118 to establish a direct link to the network access device 102 to support get/set commands involving real time data. The SNMP agent can also access tables of the database 606 for a whole category of SNMP get/set commands. The server API allows for real time processing of alarms (traps) as they occur. The SNMP agent program 118 and or socket server 600 can monitor the network access device 102 connection status using polling messages through the TCP/IP connection. If the network access device 102 does not respond over multiple polling messages, the SNMP agent program 118 will issue a trap with the device unique id and status as offline. Also, alarms initiated by the device management program 110 when the device 102 is online and connected are sent to the SNMP agent program 118 through the generic device-to-agent interface 118*b*.

Each SNMP agent binds to a unique UDP port for communication between the SNMP agent and NMS. The unique port, given the remote device unique ID, is obtained from the remote device table in the database 606. By using the SNMP agents program 118, the network access device 102 can have multiple connections from multiple enterprise entities (e.g., NMS 120, web interface 608, application 612) via the data center 114. For scalability, each network access device 102 has the IP address and TCP port of the multi-threaded socket server 600 that it connects to. As a large number of network access devices 102 are deployed, they can be configured to point to a different server allowing segregation and thus scalability.

Each server 600 can support thousands of SNMP agent programs 118, one per remote network access device 102. Racks of servers can each serve a collection of network access device 102. The IP/Port that a network access device 102 uses to connect to the data center 114 can be changed using SNMP 'set' commands and then commanded to use the new IP/Port to connect on bootup. This can also be done using the local interface (e.g., WiFi, serial port) in the network access device 102 in the field or at the factory prior to deployment. Other device settings can also be set or changed using the SNMP 'set' commands sent to the SNMP agent programs 118 from the NMS. The SNMP 'set' commands can set or change settings such as: gain per radio frequency (RF) path; IP address and TCP port to server; unique identifier; status lights; authentication data for the wireless network and the data center; network configuration data such as DNS server, etc. The SNMP 'set' commands can also trigger events such as entering suspend mode and device reboot. In another example, an SNMP 'set' command can steer a beam in a repeater.

The SNMP agent programs 118 also support reading device status through 'get' commands sent to the agents 118 from the NMS 120. For example, SNMP 'get' commands can be used to read: gain settings of the RF front ends; RSSI for each RF path; unique ID; temperature of the power amplifiers in the RF front end; status of the SoC operating environment (e.g., temperature, voltage); GPS coordinates; beam forming steering support, etc. The SNMP agent programs 118 can also configure SNMP traps, such as: over-temperature thresholds; lost connection to device 102 via Internet; device 102 is on-line via the Internet. This is a non-limiting example of SNMP get/set commands and traps.

Associated with the SNMP commands and traps are text-based Management Information Base (MIB) files and one or more object identifiers (OID). A commercial grade MIB compiler can be used to develop the MIBs and compile them and integrate them into the SNMP agent program 118. An example OID that can be used with a network access device is: 1.3.6.1.4.1.58864.1.1.1400.2.1, where 58864 is a vendor Private Enterprise Number (PEN) as supplied by Internet Assigned Numbers Authority and 1400 is an internal device designator assigned by the vendor. This is similar to how MAC addresses are assigned to ensure they are globally unique (if properly implemented by the vendor).

Figure 7:
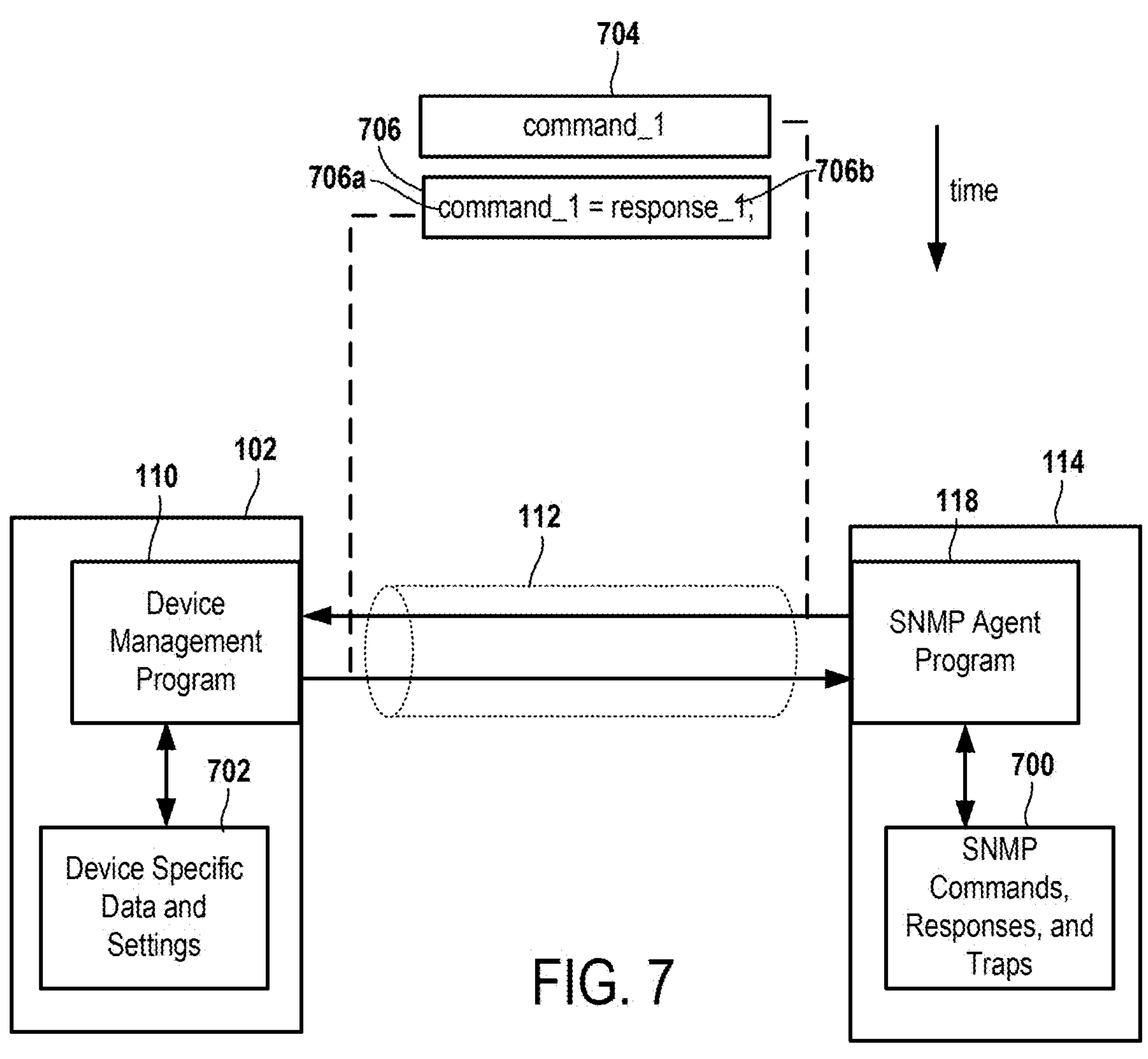
FIG. 7 is a block diagram showing message passing between network access devices and agent programs according to an example embodiment.

As noted above, the SNMP agent programs 118 and device management programs 110 of the network access devices 102 communicate using a generic, message-passing protocol over the persistent network socket 112. In FIG. 7, a block diagrams shows a command exchange according to an example embodiment. The SNMP agent program 118 exchanges SNMP data 700 with an entity in the data center 114. The SNMP data 700 includes SNMP commands, responses, and traps. The device management program 110 exchanges device data 702 within the device 102, e.g., via an OS, firmware, direct memory access, etc.

Shown in FIG. 7 is a command 704 being sent from the SNMP agent program 118 and corresponding response 706 being sent from the network access device 102. Each command has an associated response. The response 706 is a name-value pair comprising command part 706*a*, an equal character (=), the response 706*b*, terminated by a semicolon (;). In this way, through multiple efforts if needed, a command can get through and the response can be checked so as to verify that it is a response from the command (using the name value pair). For example, a command like "Get_Temp" could invoke a response of "Get_Temp=30" instead of just "30." This can avoid improperly interpreting responses when multiple commands are sent in quick succession, for example. The commands and responses may also include and/or be associated with identifiers that are unique to the respective network access device 102. If no response is received in a predefined time, the SNMP agent program sends an SNMP trap that the network access device is offline.

The SNMP agent program 118 (or the multi-threaded socket server 600) sends heart beats (previously described as polling messages) to the network access device 102 and expects a response. The network access device 102 responds to the heartbeat indicating the device 102 is alive and has a good connection. At the data center 114, if a response is not received over an interval (e.g., one minute) an alarm is sent. Also, a database table of on-line status of the network access device is updated as offline.

Figure 8:
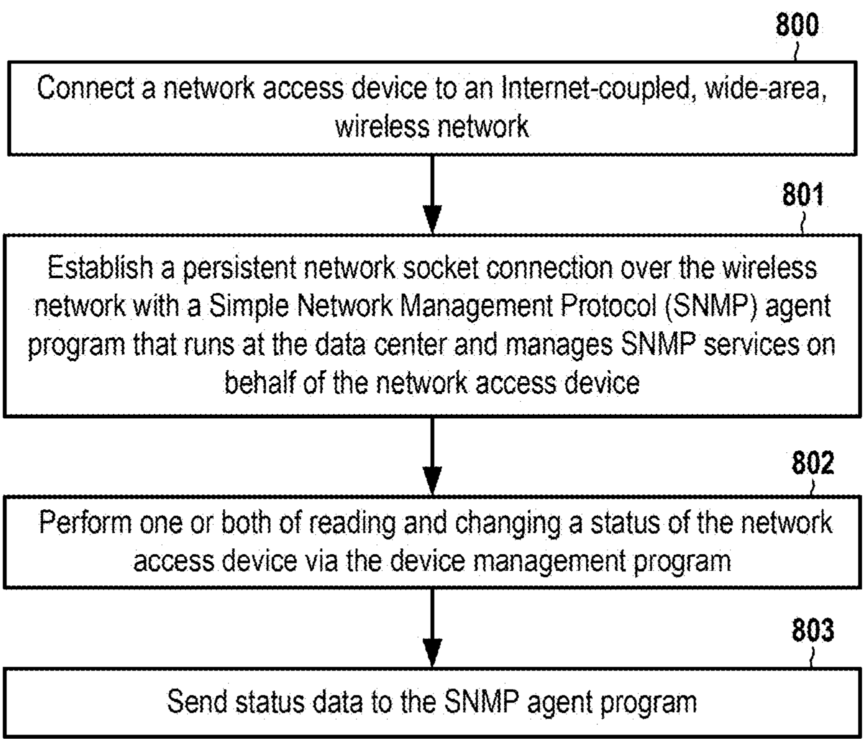
FIGS. 8 and 9 are flowcharts of methods according to example embodiments.

In FIG. 8, a flowchart shows a method according to an example embodiment that is operable on a network access device operating remotely from a data center. The method involves connecting 800 the network access device to an Internet-coupled, wide-area, wireless network. Via a persistently-executing, device management program running on the network access device, a persistent network socket connection is established 801 over the wireless network with a SNMP agent program that runs at the data center and manages SNMP services on behalf of the network access device. Based on commands received via the persistent network socket connection, one or both of reading and changing a status of the network access device is performed 802 via the device management program. In response to the commands, status data is sent 803 to the SNMP agent program, which uses the status data to communicate the status of the network access device to a network management station via SNMP protocol.

Figure 9:
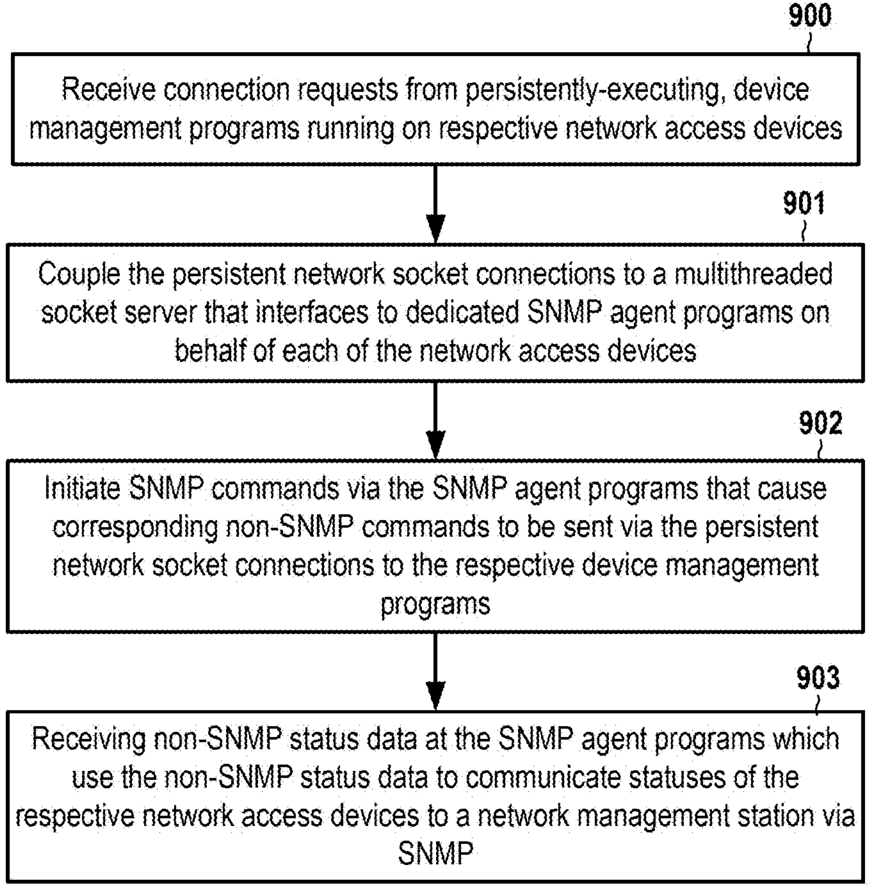

In FIG. 9, a flowchart shows a method according to an example embodiment that is method operable via a data center. The method involves receiving 900 connection requests from persistently-executing, device management programs running on respective network access devices. The network access devices are coupled to the data center via one or more Internet-coupled, wide-area, wireless networks. The connection requests establish respective persistent network socket connections to the data center. The persistent network socket connections are coupled 901 to a multithreaded socket server that interfaces to dedicated SNMP agent programs on behalf of each of the network access devices. SNMP commands are initiated 902 via the SNMP agent programs that cause corresponding non-SNMP commands to be sent via the persistent network socket connections to the respective device management programs. In response to the non-SNMP commands, non-SNMP status data is received 903 at the SNMP agent programs, which use the non-SNMP status data to communicate statuses of the respective network access devices to a network management station via SNMP.

In summary, a system, method, and apparatuses are described for monitoring and controlling a plurality of network access devices that are remotely distributed and coupled to at least one Internet-coupled, wide-area wireless network. Each of the plurality of network access devices persistently executes respective device management programs. An Internet-coupled data center runs a plurality of SNMP agent programs. Each of the SNMP agent programs communicates with a respective one of the device management programs via persistent network socket connections. A provider employing the various embodiments described herein can have real-time two-way control of the network access devices for engineering and network optimization. Other features provided by the embodiments described herein include adaptability for a diversity of remote network access devices and device capabilities. Further the system is not affected by Internet Service Provider (ISP) blocking of connections to local devices, as the socket connections are made from the remote devices to the data center, not the other way around.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g., 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. A system, comprising:

a plurality of network access devices that are remotely distributed and coupled to at least one Internet-coupled, wide-area wireless network, each of the plurality of network access devices persistently executing respective device management programs, the device management programs operable to:

read and change local device status; and maintain respective persistent network socket connections;

an Internet-coupled data center comprising one or more servers that operate a plurality of Simple Network Management Protocol (SNMP) agent programs, each of the SNMP agent programs communicating with a respective one of the device management programs via the persistent network socket connections, the SNMP agent programs providing an SNMP interface at the data center; and a network management station that manages the respective network access devices via the respective SNMP interfaces, the respective device management programs, and the respective persistent network socket connections.

2. The system of claim 1, wherein at least one of the device management programs comprise a daemon running native object code on an operating system.

3. The system of claim 2, wherein at least one other of the device management programs comprise embedded object code running on an embedded system without a local operating system, wherein the native object code and the embedded object code communicate via a common protocol.

4. The system of claim 1, wherein at least one of the device management programs comprise embedded object code running on an embedded system without an operating system.

5. The system of claim 4, wherein the embedded object code establishes and maintains the persistent network socket connection via a peripherally attached wireless modem of the network access device.

6. The system of claim 5, wherein the peripherally attached wireless modem and the network access device are coupled via a serial peripheral interface.

7. The system of claim 1, wherein the Internet-coupled data center further comprises a multithreaded socket server that establishes the persistent network socket connections and facilitates coupling the persistent network socket connections to the SNMP agent programs.

8. The system of claim 1, wherein each SNMP agent program caches first status data associated with the respective network access device, the cached first status data being used to respond to the network management station at times when the persistent network socket connection is down, wherein second status data of the respective network access device is not cached when the persistent network socket connection is down, the second status data different than the first status data.

9. The system of claim 8, wherein, in response to the network management station requesting the second status data, each SNMP agent program provides an indication that the persistent network socket connection is down.

10. The system of claim 1, wherein the SNMP agent programs communicate with the respective device management programs via a non-SNMP message passing protocol.

11. The system of claim 10, wherein the non-SNMP message passing protocol comprise commands and associated responses, the associated responses comprising the command and a response to the command.

12. A method operable on a network access device operating remotely from a data center, comprising:

connecting the network access device to an Internet-coupled, wide-area, wireless network;

via a persistently-executing, device management program running on the network access device, establish a persistent network socket connection over the wireless network with a Simple Network Management Protocol (SNMP) agent program that runs at the data center and manages SNMP services on behalf of the network access device;

based on commands received via the persistent network socket connection, performing one or both of reading and changing a status of the network access device via the device management program; and in response to the commands, sending status data to the SNMP agent program which uses the status data to communicate the status of the network access device to a network management station via SNMP.

13. The method of claim 12, wherein the network management station initiates an SNMP command with the SNMP agent program that causes the commands to be sent via the persistent network socket connection.

14. The method of claim 12, wherein the SNMP agent program communicates with the device management program via a non-SNMP message passing protocol.

15. The method of claim 14, wherein the non-SNMP message passing protocol comprises the commands and associated responses, the associated responses comprising the command and a response to the command.

16. A method operable via a data center, comprising:

receiving connection requests from persistently-executing, device management programs running on respective network access devices, the network access devices coupled to the data center via one or more Internet-coupled, wide-area, wireless networks, the connection requests establishing respective persistent network socket connections to the data center;

coupling the persistent network socket connections to a multithreaded socket server that interfaces to dedicated SNMP agent programs on behalf of each of the network access devices;

initiating SNMP commands via the SNMP agent programs that cause corresponding non-SNMP commands to be sent via the persistent network socket connections to the respective device management programs; and in response to the non-SNMP commands, receiving non-SNMP status data at the SNMP agent programs which use the non-SNMP status data to communicate statuses of the respective network access devices to a network management station via SNMP.

17. The method of claim 16, wherein the connection requests are received at the multithreaded socket server that couples the persistent network socket connections to the SNMP agents.

18. The method of claim 17, wherein the Internet-coupled data center further comprises the multithreaded socket server that establishes the persistent network socket connections.

19. The method of claim 16, wherein the SNMP agent program caches a first status data associated with the respective network access device, the cached first status data being used to respond to the network management station at times when the persistent network socket connection is down, wherein second status data of the respective network access device is not cached, the second status data different than the first status data.

20. The method of claim 19, wherein, in response to the network management station requesting the second status data, the SNMP agent program provides an indication that the persistent network socket connection is down.

21. The method of claim 16, wherein the SNMP agent programs communicate with the respective device management programs via a non-SNMP message passing protocol.

22. The method of claim 21, wherein the non-SNMP message passing protocol comprises commands and associated responses, the associated responses comprising the command and a response to the command.

* * * * *